(12) United States Patent
Chen et al.

(10) Patent No.: US 8,121,048 B2
(45) Date of Patent: Feb. 21, 2012

(54) REPEAT CONTROL METHOD IN ENHANCED UPLINK ASYNCHRONOUS HYBRID AUTOMATIC REPEAT REQUEST

(75) Inventors: Hui Chen, Shenzhen (CN); Yincheng Zhang, Shenzhen (CN); Zhifeng Ma, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 12/377,929

(22) PCT Filed: Aug. 15, 2007

(86) PCT No.: PCT/CN2007/002462
§ 371 (c)(1),
(2), (4) Date: May 25, 2010

(87) PCT Pub. No.: WO2008/025232
PCT Pub. Date: Mar. 6, 2008

(65) Prior Publication Data
US 2011/0134829 A1   Jun. 9, 2011

(30) Foreign Application Priority Data
Aug. 22, 2006   (CN) .......................... 2006 1 0109893

(51) Int. Cl.
*H04L 1/00* (2006.01)
*H04L 12/26* (2006.01)
*H04L 12/28* (2006.01)
*H04L 12/56* (2006.01)
*H04W 4/00* (2009.01)

(52) U.S. Cl. .......................... 370/252; 370/328; 370/389
(58) Field of Classification Search .................. 370/252, 370/328, 389
See application file for complete search history.

(56) References Cited

U.S. PATENT DOCUMENTS

| 7,636,312 | B2 | 12/2009 | Lee et al. |
| 2006/0156165 | A1 | 7/2006 | Kim |
| 2006/0190610 | A1 | 8/2006 | Motegi et al. |
| 2007/0081492 | A1* | 4/2007 | Petrovic et al. ............... 370/331 |

FOREIGN PATENT DOCUMENTS

| JP | 1354930 A | 6/2002 |
| JP | 2005-539465 A | 12/2005 |
| JP | 2006-217085 A | 8/2006 |
| JP | 1881863 A | 12/2006 |
| WO | 2005125109 A2 | 12/2005 |
| WO | 2006034747 A1 | 4/2006 |
| WO | 2006034792 A1 | 4/2006 |

* cited by examiner

*Primary Examiner* — Ronald Abelson
(74) *Attorney, Agent, or Firm* — Brooks Kushman P.C.

(57) ABSTRACT

A repeat control method in enhanced uplink asynchronous hybrid automatic repeat request (HARQ) includes the following steps: (1) the network side adding a repeat timer parameter in the HARQ attribute of each dedicated media access control (MAC-d) entity flow, the user terminal setting the repeat timer value in the enhanced media access control (MAC-e) entity protocol data unit (PDU) according to the repeat timer parameter; (2) the user terminal performing the repeat control utilizing the repeat timer value in cooperation with the maximum repeat number. The wireless bearer QoS requirement and the cooperation working between the sender and the receiver are implemented.

9 Claims, 3 Drawing Sheets

REPEAT CONTROL METHOD IN ENHANCED UPLINK ASYNCHRONOUS HYBRID AUTOMATIC REPEAT REQUEST

TECHNICAL FIELD

The present invention relates to a repeat control method in the asynchronous hybrid automatic repeat request (HARQ) in the TD-SCDMA system, and especially, to a repeat control method in the enhanced uplink asynchronous HARQ in the TD-SCDMA system

BACKGROUND ART

The application for setting up an enhanced uplink in the low chip TD-SCDMA system is approved by 3GPP (3$^{rd}$ Generation Partnership Project) in March 2006. The enhanced uplink is generally called HSUPA (High Speed Uplink Packet Access), which aims for improving the efficiency of the uplink through advanced technique to effectively support web browse, video, multimedia information and other IP-based services.

Although the TD-SCDMA of 3GPP has no complete technical report until now, the basic technical framework has been developed and it is basically consistent with that of the TD-CDMA system. For the basic technical framework, which can refer to proposal and conference report in 3GPP conference held in Shanghai in May, and the related technical framework of the present invention is described as follows.

A transmission channel E-DCH (Enhanced-uplink Dedicated transmission Channel) for carrying the uplink data is added in HSUPA, and the TTI (Transmission Time Interval) of the E-DCH is 5 ms.

The new added physical channels are:

E-AGCH (E-DCH absolute grant channel), which is a control channel used for Node B to transmit the grant information;

E-PUCH (enhanced physical uplink channel), which is a traffic channel used for the UE (User Equipment) to carry E-DCH encoding combination and aided scheduling related information;

E-RUCCH (HSUPA random access uplink control channel), which is a physical control channel used to transmit the aided scheduling related information when UE has not been granted, and E-RUCCH uses the random access physical channel resource;

E-HICH (E-DCH HARQ indication channel), which is a control channel used for Node B to carry HARQ indication information.

According to scheduling method, HSUPA service is divided into scheduling service and non-scheduling service, where the resource of the non-scheduling service is assigned to UE by SRNC (Service Radio Network Controller), and the assignment method is the same as that of the dedicated channel in the prior art; The scheduling service is based on the scheduling of Node B which sends absolute grant information including power grant information and physical channel grant information to the UE through the E-AGCH. The grant information is not sent to the UE in each TTI (Transmit Time Interval), and it is totally up to the scheduling function entity of the Node B to determine whether to send the grant information and when to send it according to the network condition and the parameter QoS (Quality of Service) of the UE. The UE intercepts one group of E-AGCHs, and the UE reads the grant information once the information is decoded successfully and sends the data through the granted E-PUCH after a time period prescribed by the protocol.

Another key technology used by the enhanced uplink is parallel stop-wait HARQ technology which is used to implement the rapid retransmission of the wrong packet. The entity processing the HARQ function is located in the MAC-es/e (enhanced media access control sub-entity/enhanced media access control entity) at the UE side and in the MAC-e (enhanced media access control entity) in Node B, and one HARQ entity supports several examples of the stop-wait HARQ protocol, and each example is called as a HARQ process. Although the number of parallel processes in one HARQ entity has not been determined yet, it is not less than 4, and one HARQ process relates to a physical layer buffer which is used to cache the data to facilitate the retransmission at the sender side and to combine softly and decode at the receiver side. The HARQ entity at the UE side is used to save and retransmit the MAC-e PDU (protocol data unit); The HARQ entity at the Node B side is used to generate ACK or NACK indication for a single MAC-e PDU and send the indication to the UE through the E-HICH.

In the TD-SCDMA enhanced uplink technology, a group of logical channels belonging to one UE with the same QoS are mapped to the same MAC-d (dedicated media access control) flow, and one UE can support 16 logical channels, 8 MAC-d flows at most, and the higher layer admits several MAC-d flows multiplexed into a MAC-e PDU at most and configures MAC-d flow multiplexing list for each MAC-d flow, the QoS of MAC-d flows in the list is close to that of the MAC-d flow. When assembling the MAC-e PDU, the data are multiplexed according to the priorities of the logical channels, meanwhile, the multiplexing list of the MAC-d flow in which the logical channel with the highest priority is located configured by the higher layer should be considered. The higher layer configures a HARQ Profile (service attribute) including the maximum number of retransmissions (which also can be "the maximum number of transmissions', and "the maximum number of retransmissions" is "the maximum number of transmissions" minus one) and power offset for each MAC-d flow to show the QoS attribute of each MAC-d flow.

The maximum number of retransmissions in the HARQ Profile of one MAC-e PDU is generated according to the following rules:

The maximum number of retransmissions is the maximum one of the maximum numbers of retransmissions of all MAC-d flows multiplexed into this MAC-e PDU;

The maximum number of retransmissions shows the delay and the residual bit rate requirements of the MAC-e PDU. When a new transmission begins, the HARQ entity provides a HARQ process with the MAC-e PDU and its HARQ profile, wherein the maximum number of retransmissions is used for the HARQ process to give up retransmission when the number of PDU retransmissions surpass the maximum number of retransmissions.

FIG. 1 shows the MAC-es/e at the UE side, wherein the E-TFC (enhanced transmission format collection) selection entity selects the length of the transmission block for the new data according to the grant information; The multiplexing and TSN (Transmission Sequence Number) setting entity is responsible for putting several MAC-d PDUs from one logical channel to the MAC-es (enhanced media access control sub-entity) PDU, and multiplexing one or several MAC-es PDUs to one MAC-e PDU and generating the HARQ Profile according to the selection result of the E-TFC selection entity; The scheduling access entity is responsible for obtaining and regulating the signaling information related to the scheduling; The HARQ entity is responsible for processing the HARQ protocol, including saving and retransmitting the MAC-e PDU.

FIG. 2 shows the flow of data transmission, in which after the grant is received, retransmission is primarily considered, a suitable retransmission packet is selected to notify the corresponding HARQ process to retransmit, and the retransmission processing of the HARQ process is as follows: the information such as retransmission sequence number and power offset is provided to the physical layer for retransmission, and the value of the retransmission counter is automatically added by 1; If the value of the counter surpasses the maximum number of retransmissions of this MAC-e PDU, the packet is discarded, the HARQ process is cleared, and the packet will not be retransmitted. If there is no retransmission packet or the granted resource is not suitable for the present retransmission packet after a grant is received, the E-TFC selection entity is notified to select the transmission format; The multiplexing and TSN setting entity assembles the MAC-e PDU and generates the HARQ profile; The HARQ entity selects a free process to transmit new data, and the process of HARQ process is as follows: the information such as transmission format, retransmission sequence number, process number and power offset is provided to the physical layer and the retransmission counter is cleared to zero.

The Node B sets up a MAC-e for each UE using the enhanced uplink, and one scheduler controls the scheduling of the UE, generates ACK and NACK indication for single MAC-e, and de-multiplexes the MAC-e PDU as MAC-es PDUs; The SRNC creates one MAC-es for each UE using the enhanced uplink, which is used to reorder and de-multiplex the MAC-es PDUs, wherein the reordering mechanism is similar to that in the present HSDPA.

The scheduling service in the TD-SCDMA enhanced uplink applies synchronous confirmation and asynchronous retransmission HARQ mechanism. Taking the scheduling service as an example, the timing relationship is shown as FIG. 3: after the UE receives the E-AGCH grant information, it sends data through E-PUCH after the timing T1 and then receives HARQ indication through the E-PUCH from Node B after the timing T2, if the received information is NACK, the UE will not retransmit the data until it receives the absolute grant and the waiting time is T3; if the received information is ACK, the UE will discard the data block, clear the related HARQ process, and wait for the next grant to transmit new data. Wherein, T1 and T2 have definite timing relationship, and T3 is variable, which depends on the scheduling of Node B.

The HARQ asynchronous retransmission mechanism applied today can not guarantee the retransmission time of the MAC-e PDU, because the delay requirement of QoS in the radio bearer can not be guaranteed only depending on the configuration of the number of retransmissions, and in the transmission mechanism of the upper layer RLC (radio link control) using the confirmation mode, the MAC layer of the UE is not allowed to perpetually wait for retransmission resources.

In addition, when the MAC-es at the network side performs reordering, timer mechanism and window mechanism are always applied to avoid reordering buffer congestion and sequence number confusion. The timer mechanism is used to avoid waiting for the packet with low sequence number too long in non-ordering transmission; the window mechanism is used to avoid the sequence number confusion, and since the sequence number space of the packet is limited, the sequence numbers of the new and old packets may be the same in the retransmission mechanism system, which will result in the sequence number confusion at the receiver side. Nowadays, the 3GPP organization definitely points out that this portion is not standardized and it is SRNC internal processing mechanism, which, however, needs cooperation from the UE side to avoid unnecessary retransmission. For example, without the cooperation from the UE side, there is possibility that the reordering timer at the network side is timed out but the number of transmissions at the UE side has not surpassed the maximum number of retransmissions, thus the retransmitted data from the UE side will not be processed at the network side, which will result in unnecessary retransmission.

SUMMARY OF THE INVENTION

In order to overcome the above problems, the present invention provides a repeat control method in the enhanced link asynchronous HARQ to control the HARQ retransmission and to guarantee the retransmission delay of the MAC layer and to ensure that the conditions of retransmissions at the receiving and sending ends are consistent.

In order to achieve the above object, the repeat control method in the enhanced uplink asynchronous HARQ in accordance with the present invention includes:

(1) The network side adds the parameter of retransmission timer into the HARQ Profile of each MAC-d flow of the UE which then configures the value of the retransmission timer of the MAC-e PDU according to the parameters of retransmission timer of each MAC-d flow multiplexed into the MAC-e PDU;

(2) The UE controls the retransmission by using the value of the retransmission timer and the maximum number of retransmissions of the MAC-e PDU.

Furthermore, said step (1) further comprises:

(11) When the network side configures the enhanced uplink radio bearer for the UE, the parameter of the retransmission timer is added into the HARQ Profile of each MAC-d flow;

(12) When the UE configures the HARQ Profile of the MAC-e PDU, the maximum value in the parameters of the retransmission timers of all MAC-d entity flows multiplexed into this MAC-e PDU is selected as the value of the retransmission timer of this MAC-e PDU.

Furthermore, said step (2) further comprises:

(21) The UE sends new data;

(22) When the UE receives an indication from the corresponding enhanced uplink HARQ indication channel, if NACK is received after the first transmission of the data, the retransmission timer of this MAC-e PDU is started up, and step (23) is performed; otherwise, the flow ends;

(23) The UE determines whether the number of retransmissions is less than the maximum number of retransmissions of the packet, if yes, step (24) is performed, otherwise, the flow ends;

(24) The UE retransmits the MAC-e PDU before the retransmission timer times out; and the UE discards the data after the retransmission timer times out.

Furthermore, said step (24) further comprises:

(241) After the UE obtains the retransmission resources, if the retransmission timer does not time out, the UE retransmits the data and the number of retransmissions is added by 1, and it is to return to step (22); otherwise, the UE discards the data, and the flow ends.

Furthermore, said step (22) further comprises:

When the UE receives the NACK indication information again after it retransmits the data, it continually waits for retransmission resource when the number of retransmissions does not reach the maximum number of retransmissions, and sustains the original retransmission timer.

Furthermore, in said step (11):

When the network side configures the enhanced uplink radio bearer for the UE, in the step of adding the parameter of the retransmission timer in the HARQ Profile of each MAC-d flow, the configured parameter of the retransmission timer matches the retransmission timer of the reordered queue at the network side when configuring the parameter of the retransmission timer.

Furthermore, in said step (11):

When the network side configures the enhanced uplink radio bearer for the UE, in the step of adding the parameter of the retransmission timer in the HARQ Profile of each MAC-d flow, if the window mechanism is used in the high speed uplink packet access system, the configured parameter of the retransmission timer matches the transmission window parameter configured for the UE.

Furthermore, said step (12) further comprises:

When the UE configures the HARQ Profile of the MAC-e PDU, the maximum value in the maximum number of retransmissions of all MAC-d entity flows multiplexed into this MAC-e PDU is selected as the maximum number of retransmissions of this MAC-e PDU.

Furthermore, said step (11) further includes:

When the higher layer of the network side configures the enhanced uplink radio bearer for the UE and configures the multiplexing list of the MAC flow, a group of MAC-d flows with similar QoS are multiplexed.

In the repeat control method in the enhanced uplink asynchronous HARQ in accordance with the present invention, the network side adds the parameter of retransmission timer into the attributes of each MAC-d entity flow of the UE which sets the value of the retransmission timer of the MAC-e PDU according to the parameter of retransmission timer of each MAC-d flow, and the retransmission is controlled by making the retransmission timer of the MAC-e PDU match the maximum number of retransmissions to meet the delay requirement of retransmission in the radio bearer QoS, to achieve the cooperation between the network side and the UE, and to avoid the unnecessary retransmission of the UE. The present invention can also be used in TD-CDMA system and TD-SCDMA system.

PREFERRED EMBODIMENTS OF THE PRESENT INVENTION

Figure 1:
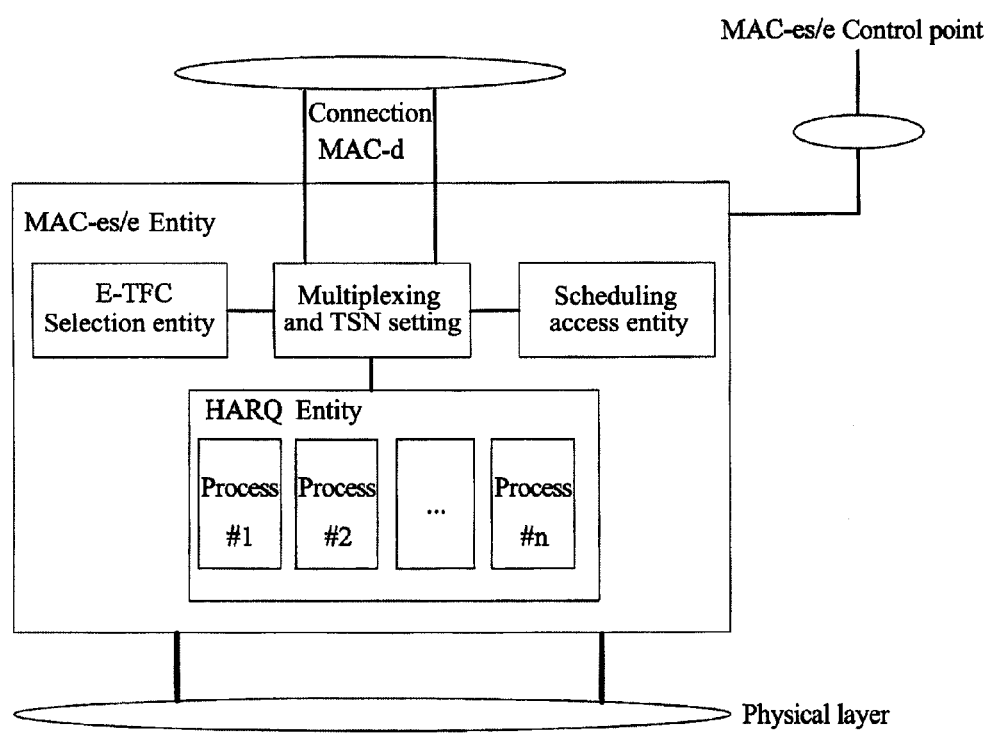
FIG. 1 shows a structure of the MAC-es/e at the UE side.
Figure 2:
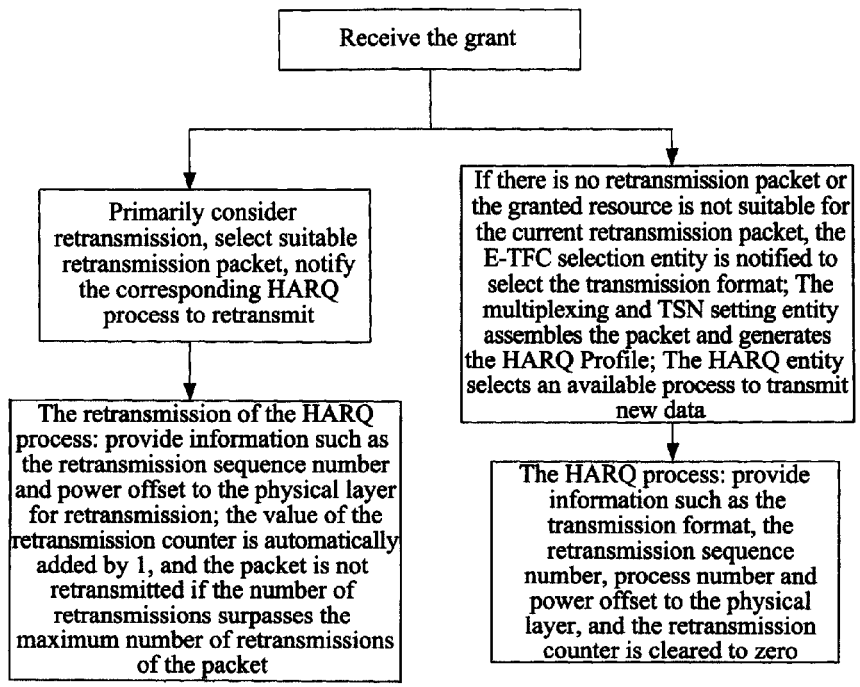
FIG. 2 is a flow chart of data transmission in the prior art.
Figure 3:
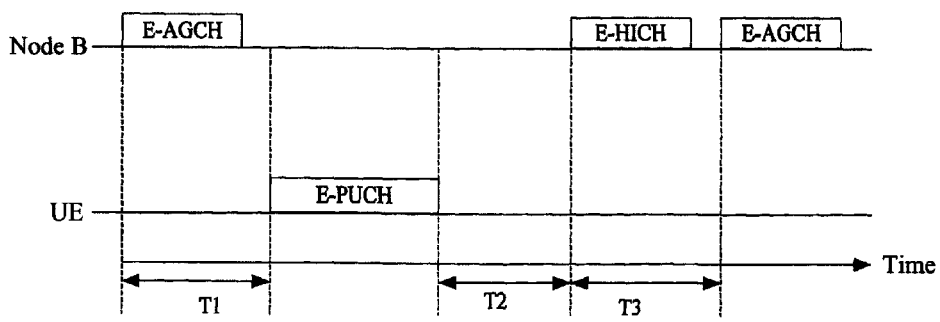
FIG. 3 is a diagram of HARQ time sequence in the synchronous confirmation and asynchronous retransmission mode.

By adding the configuration parameters of the retransmission timer for each MAC-d flow of the UE and with the maximum number of the retransmissions, the repeat control method in the enhanced uplink asynchronous HARQ in accordance with the present invention meets the delay requirement and residual bit rate requirement of the radio bearer in the asynchronous HARQ retransmission mechanism. The present invention will be described by taking the HSUPA technology in the TD-SCDMA system as an example.

Step 1, when the network side configures E-DCH radio bearer for the UE, it comprehensively takes the delay requirement and residual bit rate requirement of the MAC-d flow into account and also take the timer setting of the reordered queue at the network side into consideration to configure the parameter the retransmission timer T-Retrans together with the parameter the number of retransmissions. The T-Retrans is added in the HARQ Profile of each MAC-d flow to control the maximum retransmission time of each MAC-d flow.

Since the QoS attributes of the logical channels mapped in one MAC-d flow in HSUPA are the same, the present invention will set the retransmission timer by taking the MAC-d flow as the unit.

When the higher layer configures "T_Retrans", it should match the timers of reordered queue at the network side to avoid inconsistence between the receiver side and the sender side. If the window mechanism is also used in HSUPA system, the transmission window parameters configured by the higher layer for the UE should match the parameter of "T_Retrans" to achieve the high efficiency at the sender side.

Table 1 shows some information elements of the configuration parameters of the MAC-d flow, and the element "T_Retrans" is added besides the original power offset and the maximum number of retransmissions, and the method used is: when the UE sends new data through the granted E-PUCH, if NACK indication is received in the following E-HICH, the timer is started up and the PDU is discarded after the tinier is timed out. In the column "Exist" in Table 1, MP means that the element must be present; OP means the element is optionally present.

| Information element | Exist | Type |
| --- | --- | --- |
| E-DCH MAC-d flow identify | MP | |
| E-DCH MAC-d flow power offset | OP | Integer |
| E-DCH MAC-d flow maximum number of retransmissions | OP | Integer |
| T_Retrans | OP | Integer |
| E-DCH MAC-d flow multiplexing list | OP | Bitstring |
| ... | | |

Step 2, when the UE configures the HARQ Profile of the MAC-e PDU, the value of the retransmission timer is set to be the maximum of the retransmission tinier value of all MAC-d flows multiplexed into the MAC-e PDU.

After the UE receives the grant of Node B, the data in the logical channel with the highest priority is firstly considered according to the logical channel priority principle, and then the multiplexing list of the MAC-d flow in which the logical channel is located is considered, therefore, the finally obtained MAC-e PDU may includes the data of several MAC-d flows, and the maximum number of retransmissions of the MAC-e PDU is set to be the maximum one in the HARQ Profile of these multiplexed MAC-d flows, and the retransmission timer also selects its maximum value. When the higher layer configures the multiplexing list of the MAC-d flow, the MAC-d flows with the similar QoS are multiplexed.

Step 3, If NACK is received in the corresponding E-HICH after the UE sends new data, the retransmission timer of the MAC-e PDU is started up, and the retransmission is allowed when the number of retransmissions does not reach the maximum number of retransmissions of the MAC-e PDU and the retransmission timer does not times out; the MAC-e PDU is discarded when the maximum number of retransmissions is reached or the retransmission timer times out.

If NACK is received after the UE sends new data, it means that the PDU should be retransmitted, and it should be determined whether the number of retransmissions reaches the maximum number of retransmissions of the MAC-e PDU, if yes (in this case, the maximum number of retransmissions of the packet is 0), no more retransmissions is allowed and the HARQ process is reset to serve other new data; otherwise the retransmission timer is started up. If there is no suitable granted resource for the retransmission at this time, the retransmission packet is kept in the HARQ buffer to wait for the grant. When a suitable granted resource is received, the packet is retransmitted and the value of the retransmission counter is automatically added by 1.

If NACK is received again after retransmission, it is to continually wait for retransmission resource and sustain the original retransmission timer when the current number of retransmissions does not reach the maximum number of retransmissions.

If the radio bearer reconfiguration command is received from the higher layer and the command includes the element "T_Retrans" during the course of processing the enhanced uplink service by the UE, the UE use the new configuration parameters after the activation time indicated in the message, and when the activation time arrives, the running retransmission timer is not affected and the new configuration information is used only after the retransmission timer is started up.

Figure 4:
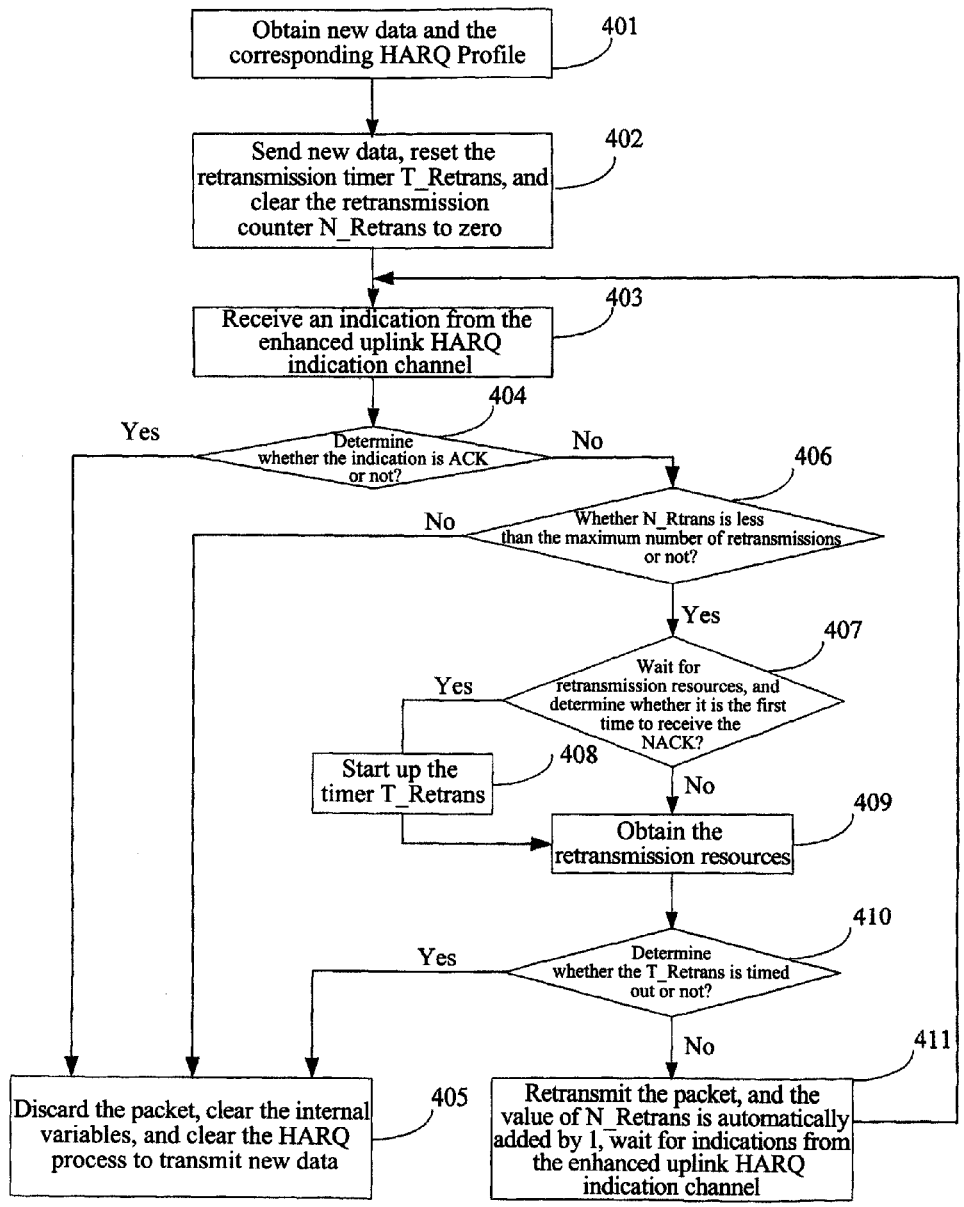
FIG. 4 is a flow chart of HARQ data transmission after adding a retransmission timer in the repeat control method in the enhanced uplink asynchronous HARQ in accordance with the present invention.

FIG. 4 is the whole flow chart of one HARQ process after using the method of the present invention, and an embodiment of the present invention will be described with reference to FIG. 4:

(401) HARQ process receives new MAC-e PDU and its HARQ Profile including the maximum number of retransmissions, power offset and the value of the retransmission timer of this MAC-e PDU from the HARQ entity, wherein the value of the retransmission timer is the maximum value of the retransmission timer of all MAC-d flows multiplexed into the MAC-e PDU;

(402) HARQ process requests the physical layer to send new data, offers necessary physical layer parameters and initializes its internal variables: the retransmission timer T_Retrans and the retransmission counter N_Retrans. T_Retrans is in reset condition; N_Retrans is cleared to zero.

(403) The UE receives HAQR indication from Node B through E-HICH;

(404) whether the HARQ indication is ACK or not is determined, if yes, then step (405) is performed; otherwise step (406) is performed;

(405) the data, the internal variables and HARQ process are cleared, and the HARQ process is used to transmit new data, and the flow ends;

(406) whether the current number of retransmissions is less than the maximum number of retransmissions or not is determined, if yes, then step (407) is performed; otherwise step (405) is performed;

(407) The packet is waiting to be retransmitted, and whether it is the first time to receive the NACK indication information is determined; if yes, step (408) is performed; otherwise step (409) is performed;

(408) the timer T_Retrans is started up;

(409) the suitable retransmission resource is obtained;

(410) whether the retransmission timer is timed out or not is determined, if yes, no more retransmissions is allowed and it is to return to step (405); otherwise step (411) is performed;

(411) the packet is retransmitted and the value of retransmission counter N_Retrans is automatically added by 1, it is to return to step (403) to continually wait for the indication from E-HICH.

In the above embodiment, if the packet is discarded, the subsequently received retransmission indication for the packet on the E-HICH will not be processed.

In the repeat control method in the enhanced uplink asynchronous HARQ in accordance with the present invention, the network side adds the parameter of retransmission timer into the in the MAC-d entity flows of the UE which configures the retransmission timer of the MAC-e PDU according to the parameter of retransmission timer of each MAC-d entity flow, and the retransmission is controlled by making the retransmission timer of the MAC-e PDU match the maximum number of retransmissions to meet the delay requirement of retransmission in the radio bearer QoS, to achieve the cooperation between the network side and the UE, and to avoid the unnecessary retransmission of the UE. If the window mechanism is also used in HSUPA system, the retransmission timer and the window mechanism cooperatively work together to realize the efficient packet transmission under HARQ asynchronous retransmission mechanism to ensure that the conditions of retransmissions at the receiving and sending ends are consistent. The present invention can also be used in TD-CDMA system and TD-SCDMA system.

INDUSTRIAL APPLICABILITY

The present invention can be used in TD-SCDMA system and also in TD-CDMA system. In the repeat control method in the enhanced uplink asynchronous HARQ in accordance with the present invention, the network side adds the parameter of retransmission timer into the MAC-d entity flow of the UE which configures the retransmission timer of the MAC-e PDU according to the parameter of retransmission timer of each MAC-d entity flow, and the retransmission is controlled by making the retransmission timer of the MAC-e PDU match the maximum number of retransmissions to meet the delay requirement of retransmission in the radio bearer QoS, to achieve the cooperation between the network side and the UE, and to avoid the unnecessary retransmission of the UE.

What we claim is:

1. A repeat control method in an enhanced uplink asynchronous hybrid automatic repeat request, wherein the method comprises:
   (1) a network side adding a parameter of a retransmission timer into a hybrid automatic repeat request Profile of each dedicated media access control entity flow of a user equipment, and the user equipment configuring a value of the retransmission timer of an enhanced media access control entity protocol data unit according to the parameters of the retransmission timer of each dedicated media access control entity flow multiplexed into the enhanced media access control entity protocol data unit;
   (2) The user equipment controlling a retransmission by using the value of the retransmission timer and the maximum number of retransmissions of the enhanced media access control entity protocol data unit.

2. A method of claim 1, wherein said step (1) comprises:
   (11) When the network side configures an enhanced uplink radio bearer for the user equipment, adding the parameter of the retransmission timer into the hybrid automatic repeat request Profile of each dedicated media access control entity flow;
   (12) When the user equipment configures the hybrid automatic repeat request Profile of the enhanced media access control entity protocol data unit, selecting the maximum value in parameters of retransmission timers of all dedicated media access control entity flows multiplexed into the enhanced media access control entity protocol data unit as the value of the retransmission timer of the enhanced media access control entity protocol data unit.

3. A method of claim 2, wherein said step (2) comprises:
(21) The user equipment sending new data;
(22) When the user equipment receives an indication from a corresponding enhanced uplink hybrid automatic repeat request indication channel, if NACK is received after a first transmission of the data, starting up the retransmission timer of the enhanced media access control entity protocol data unit, and proceeding to step (23); if the indication is ACK, ending the process;
(23) The user equipment determining whether the number of retransmissions is less than the maximum number of retransmissions of a packet, if yes, proceeding to step (24); otherwise, ending the process; (24) The user equipment retransmitting the enhanced media access control entity protocol data unit before the retransmission timer times out; and discarding the data after the retransmission timer times out.

4. A method of claim 3, wherein said step (24) comprises:
(241) After the user equipment obtains retransmission resources, if the retransmission timer does not time out, the user equipment retransmitting the data and adding the number of retransmissions by 1, and returning to step (22); otherwise, the user equipment discarding the data, and ending the process.

5. A method of claim 4, wherein said step (22) further comprises:
When the user equipment receives the NACK indication information again after retransmitting the data, the user equipment continually waiting for the retransmission resources when the number of retransmissions does not reach the maximum number of retransmissions, and sustaining the original retransmission timer.

6. A method of claim 2, wherein in said step (11):
When the network side configures the enhanced uplink radio bearer for the user equipment, in the step of adding the parameter of the retransmission timer in the hybrid automatic repeat request Profile of each dedicated media access control entity flow, the parameter configured for the retransmission timer matches the retransmission timer of a reordered queue at the network side when configuring the parameter of the retransmission timer.

7. A method of claim 2, wherein in said step (11):
When the network side configures the enhanced uplink radio bearer for the user equipment, in the step of adding the parameter of the retransmission timer in the hybrid automatic repeat request Profile of each dedicated media access control entity flow, if a window mechanism is used in a high speed uplink packet access system, the configured parameter of the retransmission timer matches a transmission window parameter configured for the user equipment.

8. A method of claim 2, wherein said step (12) further comprises:
When the user equipment configures the hybrid automatic repeat request Profile of the enhanced media access control entity protocol data unit, selecting the maximum value in the maximum number of retransmissions of all dedicated media access control entity flows multiplexed into the enhanced media access control entity protocol data unit as the maximum number of retransmissions of the enhanced media access control entity protocol data unit.

9. A method of claim 2, wherein said step (11) further comprises:
When a higher layer of the network side configures the enhanced uplink radio bearer for the user equipment and configures the multiplexing list of the media access control flow, multiplexing a group of dedicated media access control entity flows with similar Quality of Service.

* * * * *